W. D. EWART.
Drive-Chains.

No. 154,594.  Patented Sept. 1, 1874.

Witnesses
George E. Upham.
Robert Everett.

Inventor
Wm. D. Ewart
Chipman & Osmun
Attys

UNITED STATES PATENT OFFICE.

WILLIAM D. EWART, OF BELLE PLAINE, IOWA.

IMPROVEMENT IN DRIVE-CHAINS.

Specification forming part of Letters Patent No. 154,594, dated September 1, 1874; application filed January 31, 1874.

*To all whom it may concern:*

Be it known that I, WILLIAM D. EWART, of Belle Plaine, in the county of Benton and State of Iowa, have invented a new and valuable Improvement in Drive-Chains; and I do hereby declare that the following is a full, clear, and exact description of the construction and operation of the same, reference being had to the annexed drawings, making a part of this specification, and to the letters and figures of reference marked thereon.

Figure 1:
Figure 2:
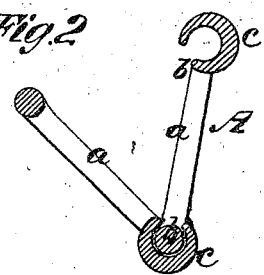
Figure 3:
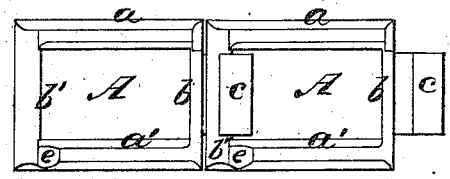
Figure 4:
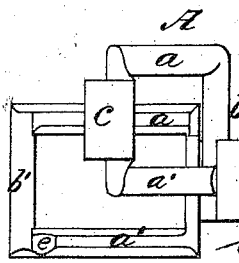

Figure 1 of the drawing is a representation of a side view of my drive-chain. Fig. 2 is a sectional view of the same. Fig. 3 is a plan, and Fig. 4 a detail, view of the same.

This invention has relation to what are denominated "rag-chains," which are used in combination with sprocket-wheels on harvesting and other machinery. It consists in a rag-chain which is made up of detachable links, for the purpose of readily substituting a new link for one which is broken; at the same time the links are not liable to casual detachment, as will be hereinafter explained.

The following is a description of my invention:

The links A are preferably of a rectangular form, longer than they are broad, their side bars $a\ a'$ being round, or nearly so, and their end bars $b\ b'$ being constructed as shown in the annexed drawings. The end bar $b$ has constructed on it a broad hook, $c$, which is about three-quarters of a circle, and which is adapted for receiving in it the end bar $b'$.

For the purpose of connecting the links and disconnecting them readily, the side bar $a'$ of each link is notched at $e\ e$, which reduces the bar at this point, so that when two links are held at an angle, (represented in Fig. 2,) they can be hooked together or unhooked. When the links are coupled the hook of one link is received between the side bars of another link, and thus when the links are straightened out they will not uncouple.

Among many advantages attending my invention, I will mention the following: They never need to be bent, riveted, or altered after they are made, and for drive-chains they allow the fastening of square or open links, so that the sprockets on the driving-pulleys can be arranged close together, thereby dividing the application of power and diminishing the strain. They allow chains to be readily shortened, or lengthened, or repaired, and they make the broadest possible bearings on each other, thereby preventing lateral motion of the chain when run slack, and increasing strength.

If the links are made of malleable metal the ends of their hooks will be properly bent after casting the links.

What I claim as new, and desire to secure by Letters Patent, is—

Driving-chain links notched or reduced at $e$, and constructed with coupling-hooks $c$, substantially as described.

In testimony that I claim the above I have hereunto subscribed my name in the presence of two witnesses.

WILLIAM DANA EWART.

Witnesses:
D. E. HALLETT,
FRANK BENESCH.